(12) United States Patent
McClay

(10) Patent No.: US 12,423,421 B2
(45) Date of Patent: *Sep. 23, 2025

(54) GENERATING SIMULATED SPEAR PHISHING MESSAGES AND CUSTOMIZED CYBERSECURITY TRAINING MODULES USING MACHINE LEARNING

(71) Applicant: Proofpoint, Inc., Sunnyvale, CA (US)

(72) Inventor: Nicholas Patrick McClay, Pittsburgh, PA (US)

(73) Assignee: Proofpoint, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/435,114

(22) Filed: Feb. 7, 2024

(65) Prior Publication Data
US 2024/0176879 A1 May 30, 2024

Related U.S. Application Data

(63) Continuation of application No. 17/065,695, filed on Oct. 8, 2020, now Pat. No. 11,928,212.

(60) Provisional application No. 63/039,102, filed on Jun. 15, 2020.

(51) Int. Cl.
| | |
|---|---|
| *G06F 21/56* | (2013.01) |
| *G06F 21/57* | (2013.01) |
| *G06N 20/00* | (2019.01) |
| *H04L 9/40* | (2022.01) |

(52) U.S. Cl.
CPC ............ *G06F 21/56* (2013.01); *G06F 21/577* (2013.01); *G06N 20/00* (2019.01); *H04L 63/1483* (2013.01); *G06F 2221/034* (2013.01)

(58) Field of Classification Search
None
See application file for complete search history.

(56) References Cited

U.S. PATENT DOCUMENTS

| | | | |
|---|---|---|---|
| 8,635,703 B1 | 1/2014 | Belani et al. | |
| 10,009,375 B1 * | 6/2018 | Sites | .................. H04L 63/1483 |
| 10,237,302 B1 * | 3/2019 | Kras | .................. H04L 63/1483 |
| 10,243,904 B1 | 3/2019 | Wescoe et al. | |
| 10,469,519 B2 | 11/2019 | Irimie et al. | |
| 10,917,429 B1 | 2/2021 | Patton et al. | |

(Continued)

*Primary Examiner* — Michael W Chao
(74) *Attorney, Agent, or Firm* — Banner & Witcoff, Ltd.

(57) ABSTRACT

Aspects of the disclosure relate to spear phishing simulation using machine learning. A computing platform may send, to an enterprise user device, a spear phishing message. The computing platform may receive initial user interaction information indicating how a user of the enterprise user device interacted with the spear phishing message. Based on the initial user interaction information and using a series of branching message templates, the computing platform may generate additional spear phishing messages. The computing platform may receive additional user interaction information indicating how the user interacted with the additional spear phishing messages. Based on the initial user interaction information and the additional user interaction information, the computing platform may compute spear phishing scores. Based on a comparison of the spear phishing scores to spear phishing thresholds, the computing platform may generate training modules for the user, and may send the training modules to the enterprise user device.

20 Claims, 11 Drawing Sheets

---

500

Spear Phishing Module

Hello Person #1,

You may have noticed some messages related to network security. These were automated phishing messages that we generated to test your ability to identify phishing attacks. Based on your interactions with these messages, you have been selected for participation in a module to improve your ability to identify these attacks. Please click the link below to launch the module.

Spear Phishing Module

Thank you,
Network Security Team

(56) References Cited

U.S. PATENT DOCUMENTS

| | | |
|---|---|---|
| 11,240,272 B2 * | 2/2022 | Albero ................ H04L 63/1483 |
| 11,429,713 B1 | 8/2022 | Donovan et al. |
| 11,477,229 B2 | 10/2022 | Covell et al. |
| 11,599,838 B2 | 3/2023 | Kras et al. |
| 11,870,806 B1 * | 1/2024 | Qian ........................ H04L 63/20 |
| 12,177,252 B2 * | 12/2024 | Kras ........................ H04L 51/42 |
| 12,198,575 B2 * | 1/2025 | Brubaker ............ H04L 63/1483 |
| 12,212,581 B2 * | 1/2025 | Fischbach ............ G06F 21/566 |
| 12,273,383 B2 * | 4/2025 | Kras ........................ G06N 20/00 |
| 2012/0124671 A1 | 5/2012 | Fritzson et al. |
| 2012/0258437 A1 | 10/2012 | Sadeh-Koniecpol et al. |
| 2013/0247052 A1 | 9/2013 | Ali et al. |
| 2014/0199663 A1 * | 7/2014 | Sadeh-Koniecpol ........................ H04L 63/1408 434/118 |
| 2014/0230064 A1 * | 8/2014 | Higbee .................. H04L 63/20 726/25 |
| 2014/0230065 A1 * | 8/2014 | Belani .................... G06F 21/00 726/25 |
| 2015/0205953 A1 * | 7/2015 | Belani .................... G06F 21/55 726/25 |
| 2016/0036829 A1 * | 2/2016 | Sadeh-Koniecpol ........................ G06F 21/567 726/23 |
| 2016/0330238 A1 | 11/2016 | Hadnagy |
| 2018/0027014 A1 * | 1/2018 | Irimie ................ G06Q 10/0639 726/22 |
| 2018/0159889 A1 * | 6/2018 | Sjouwerman ........... G06F 21/56 |
| 2018/0309764 A1 * | 10/2018 | Kras .................. G09B 19/0053 |
| 2019/0034623 A1 * | 1/2019 | Lowry ................ G06F 11/3409 |
| 2019/0171984 A1 * | 6/2019 | Irimie ................ H04L 63/1433 |
| 2019/0173907 A1 * | 6/2019 | Kras .................. H04L 63/1433 |
| 2019/0173919 A1 | 6/2019 | Irimie et al. |
| 2019/0230121 A1 * | 7/2019 | Kras ...................... G06F 21/552 |
| 2020/0099716 A1 * | 3/2020 | Sjouwerman ....... H04L 63/1466 |
| 2020/0267183 A1 * | 8/2020 | Vishwanath ........ H04L 63/1483 |
| 2020/0366713 A1 * | 11/2020 | Rodriguez .......... H04L 63/1483 |
| 2021/0152596 A1 * | 5/2021 | Hemingway ....... H04L 63/1483 |
| 2021/0312400 A1 | 10/2021 | Irimie et al. |
| 2021/0344710 A1 * | 11/2021 | Kras ...................... G09B 19/00 |
| 2021/0344713 A1 | 11/2021 | Kras et al. |
| 2022/0060495 A1 * | 2/2022 | Patton ................. H04L 63/1483 |
| 2022/0070214 A1 * | 3/2022 | Kras .................. H04L 63/1483 |
| 2022/0377093 A1 | 11/2022 | Crabtree et al. |
| 2022/0394052 A1 | 12/2022 | Grossman-Avraham |
| 2022/0417278 A1 * | 12/2022 | Irimie ................ H04L 63/1433 |
| 2023/0012756 A1 | 1/2023 | Kras |
| 2023/0046188 A1 | 2/2023 | Kras et al. |
| 2023/0070202 A1 | 3/2023 | Kras et al. |

* cited by examiner

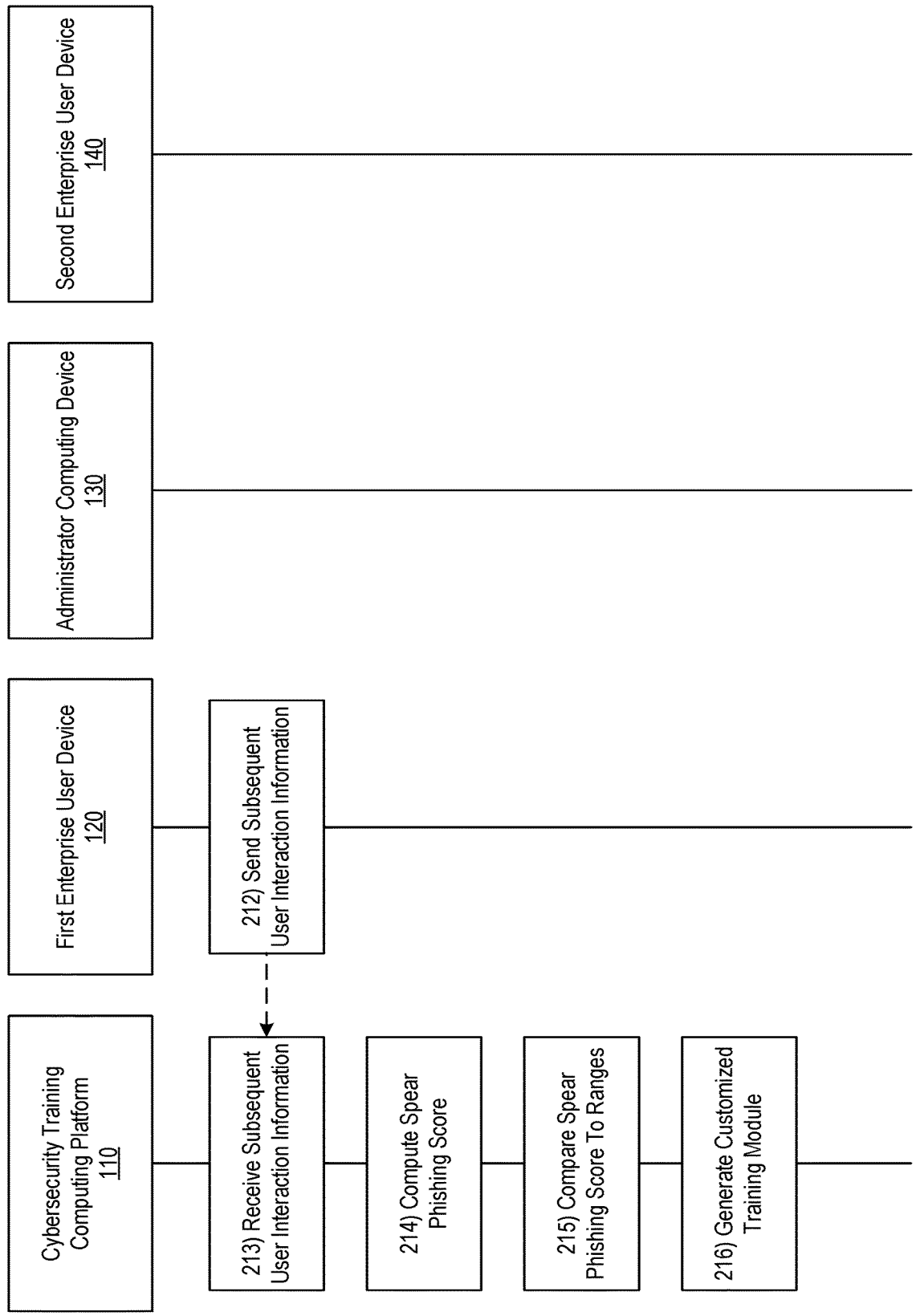

GENERATING SIMULATED SPEAR PHISHING MESSAGES AND CUSTOMIZED CYBERSECURITY TRAINING MODULES USING MACHINE LEARNING

CROSS-REFERENCE TO RELATED APPLICATIONS

This application is a continuation of and claims priority to co-pending U.S. application Ser. No. 17/065,695, filed Oct. 8, 2020, and entitled "Generating Simulated Spear Phishing Messages and Customized Cybersecurity Training Modules Using Machine Learning," which claims the benefit of and priority to U.S. Provisional Patent Application Ser. No. 63/039,102, filed Jun. 15, 2020, and entitled "Triggering Follow On Emails and Scoring Levels of Failure in Automated Spear Phishing," all of which are incorporated herein by reference in their entirety.

TECHNICAL FIELD

Aspects of the disclosure relate to ensuring and improving the security and integrity of enterprise computer systems and resources, preventing unauthorized access to secure information systems, machine learning, and cybersecurity. In particular, one or more aspects of the disclosure relate to generating simulated spear phishing messages and customized cybersecurity training modules using machine learning.

BACKGROUND

Increasingly, organizations face various cybersecurity threats through electronic communications. One increasingly common cybersecurity threat is spear phishing, which may involve highly personalized messages that are sent from an apparently trustworthy source and that encourage an individual to perform unsafe actions (e.g., click a link and/or access a site that harbors malicious code, requests sensitive or confidential information, and/or installs malware). Many enterprise organizations make efforts to educate enterprise users (e.g., employees of the enterprise organization) about cybersecurity risks like spear phishing. Because spear phishing involves using personal details to elicit emotional reactions from individuals, however, it may be difficult to train users to recognize and avoid spear phishing attacks. This problem may be particularly complex for large enterprise organizations with large user bases, as the personalized nature of spear phishing attacks may make it especially difficult to train a large set of different enterprise users to recognize such attacks. These issues are further compounded when trying to balance and optimize the providing of user training and the ensuring of network security with the consumption of computing resources, such as the processing power and network bandwidth that may be required to deliver such training and provide such security.

SUMMARY

Aspects of the disclosure provide technical solutions that overcome one or more of the technical problems described above and/or other technical challenges. For instance, one or more aspects of the disclosure relate to automatically generating simulated spear phishing messages and related cybersecurity training modules using machine learning.

In accordance with one or more embodiments, a computing platform having at least one processor, a communication interface, and memory may send, to a first enterprise user device, an initial simulated spear phishing message. The computing platform may receive, from the first enterprise user device, initial user interaction information indicating how a user of the first enterprise user device interacted with the initial simulated spear phishing message. Based on the initial user interaction information and using a series of branching message templates, the computing platform may generate one or more first follow on simulated spear phishing messages. The computing platform may receive, from the first enterprise user device, first additional user interaction information indicating how the user of the first enterprise user device interacted with the one or more follow on simulated spear phishing messages. Based on the initial user interaction information and the first additional user interaction information, the computing platform may compute one or more spear phishing scores corresponding to the user of the first enterprise user device. The computing platform may compare the one or more spear phishing scores to one or more spear phishing thresholds. Based on the comparison of the one or more spear phishing scores to the one or more spear phishing thresholds, the computing platform may generate one or more customized spear phishing training modules for the user of the first enterprise user device. The computing platform may send, to the first enterprise user device, the one or more customized spear phishing training modules, which may cause the first enterprise user device to display the one or more customized spear phishing training modules.

In one or more instances, the one or more first follow on simulated spear phishing messages may be further generated based on temporal information detected from the first enterprise user device. In one or more instances, the initial user interaction information may indicate whether the user of the first enterprise user device performed one or more of: replied to the initial simulated spear phishing message, forwarded the initial simulated spear phishing message, or deleted the initial simulated spear phishing message.

In one or more instances, the first additional user interaction information may indicate whether the user of the first enterprise user device performed one or more of: replied to the one or more first follow on simulated spear phishing messages, forwarded the one or more first follow on simulated spear phishing messages, or deleted the one or more first follow on simulated spear phishing messages. In one or more instances, the computing platform may compute the one or more spear phishing scores corresponding to the user of the first enterprise user device by: 1) assigning a first value based on a type of response to the initial simulated spear phishing message, 2) assigning a second value based on a time difference between sending the initial simulated spear phishing message and receiving the initial user interaction information, 3) assigning a third value based on a type of response to the one or more first follow on simulated spear phishing messages, 4) assigning a fourth value based on a time difference between sending the one or more first follow on simulated spear phishing messages and receiving the first additional user interaction information, and 5) applying, using the first value, the second value, the third value, and the fourth value, a spear phishing scoring algorithm, where the spear phishing scoring algorithm is: spear phishing score=$\alpha$(first value+third value)+$\beta$(second value+third value), where $\alpha$ is a first weight value, and $\beta$ is a second weight value.

In one or more instances, the computing platform may dynamically identify $\alpha$ and $\beta$ based on receipt of the initial user interaction information. In one or more instances, the computing platform may generate the series of branching message templates by performing one or more of: 1) generating, based on template input information, the series of branching message templates, or 2) automatically generating the series of branching message templates based on one or more of: historical interaction information for the user of the first enterprise user device, spear phishing training modules previously completed by the user of the first enterprise user device, or a job role of the user of the first enterprise user device.

In one or more instances, the series of branching message templates may be specific to an industry associated with the user of the first enterprise user device. In one or more instances, the computing platform may dynamically update the series of branching message templates based on interactions of other users with other spear phishing training modules.

In one or more instances, the computing platform may send, to a second enterprise user device, the initial simulated spear phishing message. The computing platform may monitor the second enterprise user device to detect temporal information for the second enterprise user device. Based on the temporal information and using the series of branching message templates, the computing platform may generate one or more second follow on simulated spear phishing messages. The computing platform may send, to the second enterprise user device, the one or more second follow on simulated spear phishing messages.

In one or more instances, the computing platform may receive, from the second enterprise user device, second additional user interaction information. Based on the temporal information and the second additional user interaction information, the computing platform may compute one or more spear phishing scores corresponding to the user of the second enterprise user device.

In one or more instances, the computing platform may compare the one or more spear phishing scores to the one or more spear phishing thresholds by comparing the one or more spear phishing scores corresponding to the user of the first enterprise user device and the one or more spear phishing scores corresponding to the user of the second enterprise user device to the one or more spear phishing thresholds. In one or more instances, the one or more spear phishing scores corresponding to the user of the first enterprise user device may include one or more of: a user specific score, a group specific score, or an organization specific score.

BRIEF DESCRIPTION OF THE DRAWINGS

The present disclosure is illustrated by way of example and not limited in the accompanying figures in which like reference numerals indicate similar elements and in which:

FIGS. 2A-2G depict an illustrative event sequence for applying machine learning in simulated spear phishing in accordance with one or more example embodiments;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure. Various connections between elements are discussed in the following description. It is noted that these connections are general and, unless specified otherwise, may be direct or indirect, wired or wireless, and that the specification is not intended to be limiting in this respect.

Some aspects of the disclosure relate to automatically and/or temporally triggering follow-on emails in an automated and simulated spear phishing campaign, as well as scoring the different levels of failure associated with different user reactions to simulated spear phishing messages. In some instances, to trigger these follow-on emails, one or more of the systems and methods described herein may employ branching templates so that different user reactions (e.g., responding, forwarding, deleting, ignoring, or other possible interactions) as well as different user replies may result in different automated responses to the user to continue the simulated spear phishing campaigns. In some instances, these different user reactions may also result in different levels of failure being scored. Accordingly, one or more aspects of the disclosure thus provide technical solutions to technical problems associated with automated spear phishing. For example, spear phish testing may result in a binary decision of pass or fail based on whether or not a user responded to a spear phishing message. But such a binary result may provide limited insights about the user. By instead generating a series of templates based on a user interaction and/or temporal information corresponding to a previously displayed spear phishing message, as described in greater detail below, more customized automated spear phishing campaigns may be employed and more nuanced data may be collected to assess the user's susceptibility to a spear phishing attack. For example, the manner in which a user interacts with each spear phishing message and/or temporal information corresponding to each spear phishing message may be assessed and scored, and may, in some instances, be used to generate a customized training module for the user. Accordingly, one or more of the systems and methods described herein may provide more customized simulated spear phishing messages, and may be used to collect more nuanced data for purposes of scoring susceptibility to spear phishing attacks and/or generating customized training modules.

Figure 1:
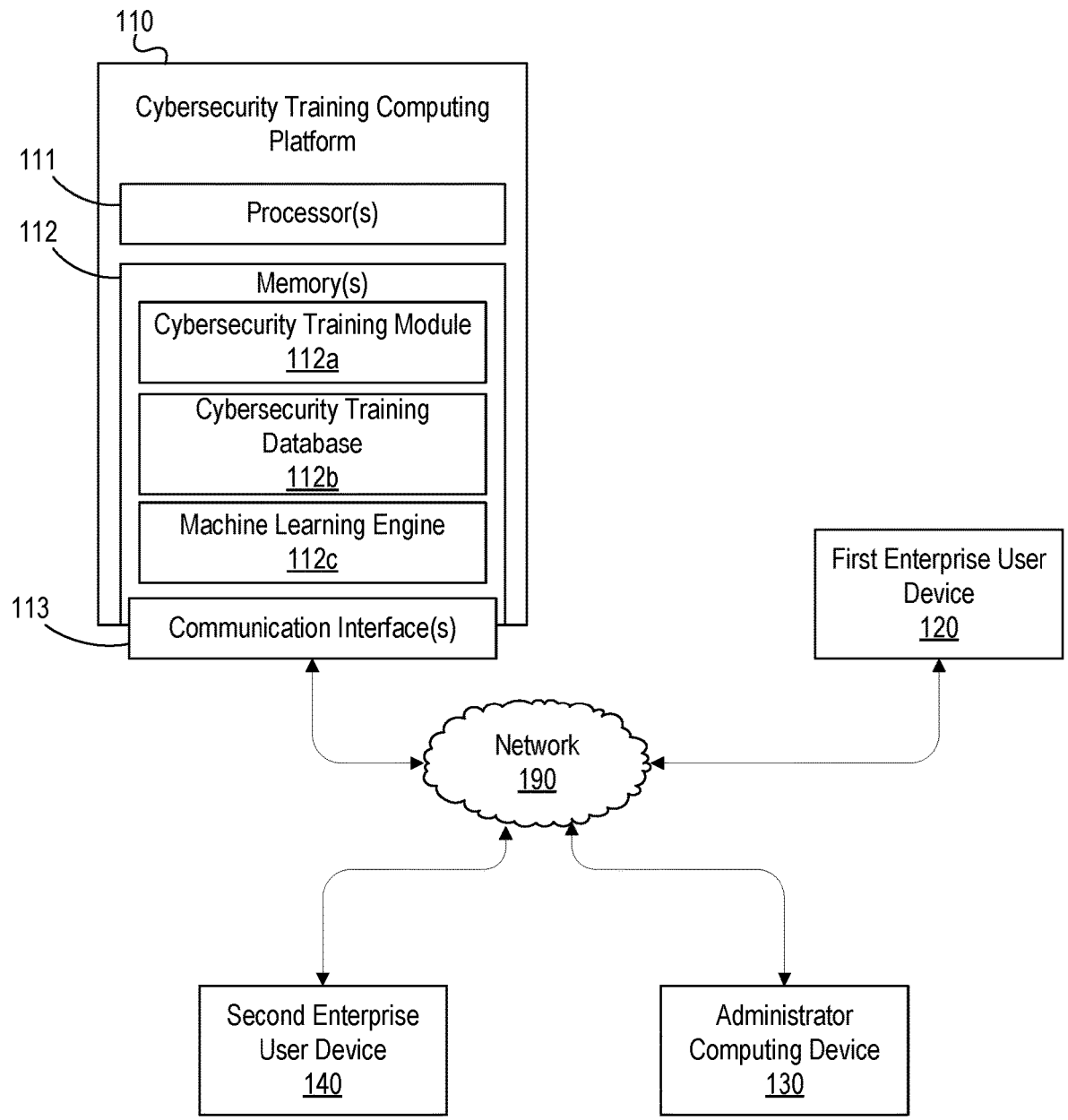
FIG. 1 depicts an illustrative operating environment for applying machine learning in simulated spear phishing in accordance with one or more example embodiments.

FIG. 1 depicts an illustrative operating environment for applying machine learning in simulated spear phishing in accordance with one or more example embodiments. Referring to FIG. 1, computing environment 100 may include various computer systems, computing devices, networks, and/or other operating infrastructure. For example, computing environment 100 may include a cybersecurity training computing platform 110, a first enterprise user device 120, an administrator computing device 130, and a second enterprise user device 140.

Network 190 may include one or more wired networks and/or one or more wireless networks that interconnect cybersecurity training computing platform 110, first enterprise user device 120, administrator computing device 130, second enterprise user device 140, and/or other computer systems and/or devices. In addition, each of cybersecurity training computing platform 110, first enterprise user device 120, administrator computing device 130, and second enterprise user device 140 may be special purpose computing devices configured to perform specific functions, as illustrated in greater detail below, and may include specific computing components such as processors, memories, communication interfaces, and/or the like.

Cybersecurity training computing platform 110 may include one or more processor(s) 111, one or more memory(s) 112, and one or more communication interface(s) 113. In some instances, cybersecurity training computing platform 110 may be made up of a plurality of different computing devices, which may be distributed within a single data center or a plurality of different data centers. In these instances, the one or more processor(s) 111, one or more memory(s) 112, and one or more communication interface(s) 113 included in cybersecurity training computing platform 110 may be part of and/or otherwise associated with the different computing devices that form cybersecurity training computing platform 110.

In one or more arrangements, processor(s) 111 may control operations of cybersecurity training computing platform 110. Memory(s) 112 may store instructions that, when executed by processor(s) 111, cause cybersecurity training computing platform 110 to perform one or more functions, as discussed below. Communication interface(s) 113 may include one or more wired and/or wireless network interfaces, and communication interface(s) 113 may connect cybersecurity training computing platform 110 to one or more networks (e.g., network 190) and/or enable cybersecurity training computing platform 110 to exchange information and/or otherwise communicate with one or more devices connected to such networks.

In one or more arrangements, memory(s) 112 may store and/or otherwise provide a plurality of modules (which may, e.g., include instructions that may be executed by processor(s) 111 to cause cybersecurity training computing platform 110 to perform various functions) and/or databases (which may, e.g., store data used by cybersecurity training computing platform 110 in performing various functions). For example, memory(s) 112 may store and/or otherwise provide cybersecurity training module 112*a*, cybersecurity training database 112*b*, and a machine learning engine 112*c*. In some instances, cybersecurity training module 112*a* may store instructions that cause cybersecurity training computing platform 110 to apply machine learning for automated spear phishing simulation, and/or execute one or more other functions described herein. Additionally, cybersecurity training database 112*b* may store data that is used by cybersecurity training computing platform 110 in applying machine learning for automated spear phishing simulation and/or in executing one or more other functions described herein. Furthermore, machine learning engine 112*c* may store instructions and/or data that may cause and/or be used by cybersecurity training computing platform 110 to generate spear phishing messages, dynamically tune one or more ranges used in cybersecurity scoring, and/or execute one or more other functions described herein.

First enterprise user device 120 may be configured to be used by a first user (who may e.g., be an employee of an enterprise organization corresponding to the cybersecurity training computing platform 110). In some instances, first enterprise user device 120 may be configured to present one or more user interfaces associated with an electronic messaging application, receive input composing new messages, display content associated with received messages, display alerts, and/or otherwise facilitate sending, receiving, and/or otherwise exchanging messages and/or other data with one or more other client devices, enterprise user devices (e.g., second enterprise user device 140, or the like), and/or other devices.

Administrator computing device 130 may be configured to be used by an administrative user (who may, e.g., be a network administrator and/or a cybersecurity analyst associated with the enterprise organization operating cybersecurity training computing platform 110). Administrator computing device 130 may be configured to present one or more user interfaces associated with an operator dashboard, receive and/or display one or more alerts, and/or otherwise facilitate monitoring and management of one or more systems and/or devices included in computing environment 100.

Second enterprise user device 140 may be configured to be used by a second user (who may e.g., be another employee of an enterprise organization corresponding to the cybersecurity training computing platform 110). In some instances, second enterprise user device 140 may be configured to present one or more user interfaces associated with an electronic messaging application, receive input composing new messages, display content associated with received messages, display alerts, and/or otherwise facilitate sending, receiving, and/or otherwise exchanging messages and/or other data with one or more other client devices, enterprise user devices (e.g., first enterprise user device 120, or the like), and/or other devices.

Figure 2A:
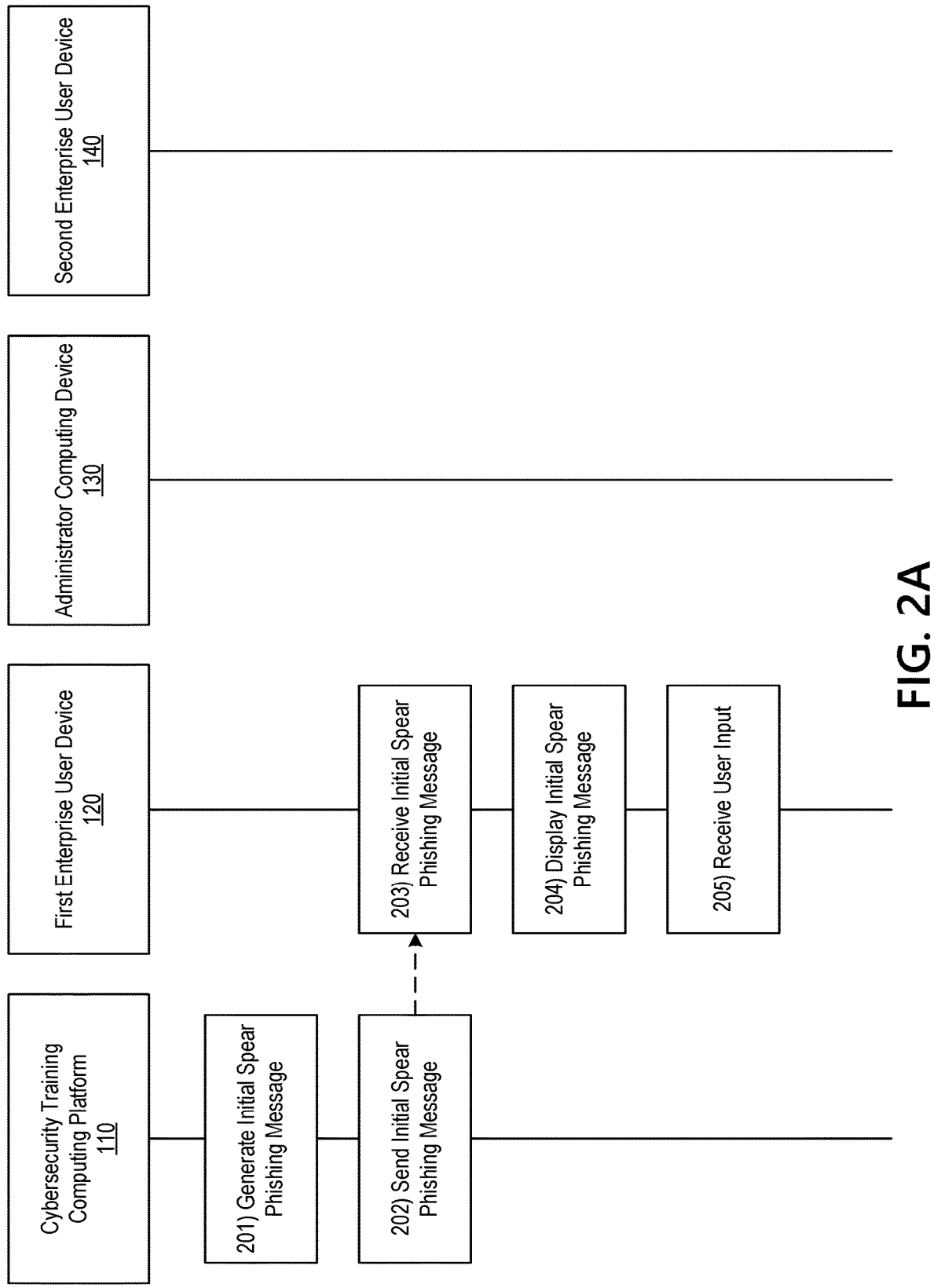

FIGS. 2A-2G depict an illustrative event sequence for applying machine learning in simulated spear phishing in accordance with one or more example embodiments. Referring to FIG. 2A, at step 201, cybersecurity training computing platform 110 may generate an initial simulated spear phishing message. For example, the cybersecurity training computing platform 110 may generate a customized message prompting an individual (e.g., a user of the first enterprise user device 120 (a first user), a user of the second enterprise user device 140 (a second user), or other users) to input personal information, navigate to another webpage, or perform other interactive actions. In some instances, the cybersecurity training computing platform 110 may generate different initial simulated spear phishing messages for each individual (e.g., each individual of an enterprise organization), each organization (e.g., each organization of a plurality of enterprise organizations), each group within an organization (e.g., by department, job title, or other subset of the enterprise organization), or other target audience. In some instances, the cybersecurity training computing platform 110 may generate the initial simulated spear phishing message using machine learning, based on user input, and/or using one or more other message generation techniques. In some instances, in generating the initial simulated spear phishing message, the cybersecurity training computing platform 110 may generate an email, short message service (SMS) message, or other message. In some instances, in generating the initial simulated spear phishing message, the cybersecurity training computing platform 110 may generate a message that includes a simulated malicious email address, a simulated malicious link, one or more requests for personal information, and/or one or more other indications that the initial simulated spear phishing message is sent from a malicious actor. In some instances, the cybersecurity training computing platform 110 may generate a message that includes a soft opening (e.g., establishes contact with the recipient without requesting personal information, tasks to be performed, or requesting other actions that may appear suspect to the recipient).

At step 202, the cybersecurity training computing platform 110 may send, share, or otherwise provide the initial simulated spear phishing message (generated at step 201) to the first enterprise user device 120. In some instances, the cybersecurity training computing platform 110 may send the initial simulated spear phishing message to an electronic messaging server that may be accessed by the first enterprise user device 120.

At step 203, the first enterprise user device 120 may receive or otherwise access the initial simulated spear phishing message sent at step 202. In some instances, the first enterprise user device 120 may receive the initial simulated spear phishing message by accessing an electronic messaging server at which the initial simulated spear phishing message may be stored.

Figure 3:
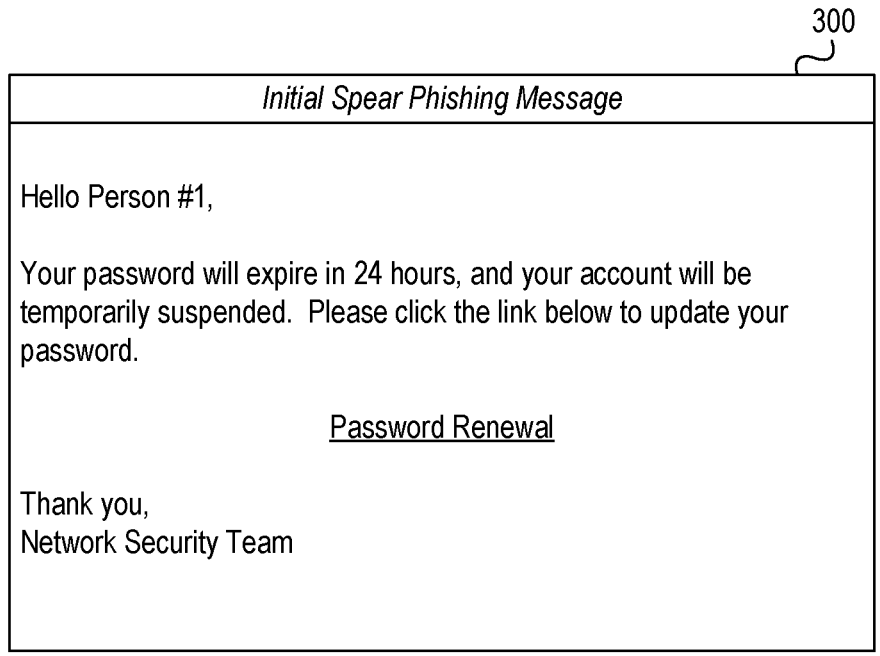
FIGS. 3-5 depict illustrative user interfaces for applying machine learning in simulated spear phishing in accordance with one or more example embodiments.

At step 204, the first enterprise user device 120 may display the initial simulated spear phishing message received at step 203. For example, in some instances, in displaying the initial simulated spear phishing message, the first enterprise user device 120 may display a graphical user interface similar to graphical user interface 300, which is shown in FIG. 3. In this example, the initial simulated spear phishing message may be sent from a malicious email address, contain a malicious link, include a request for personal information, and/or include one or more other indications that the initial simulated spear phishing message is sent from a malicious actor.

At step 205, the first enterprise user device 120 may receive user input corresponding to an interaction with the initial simulated spear phishing message. For example, the first enterprise user device 120 may receive user input indicating a reply to the initial simulated spear phishing message, selecting a link in the initial simulated spear phishing message, deleting the initial simulated spear phishing message, forwarding the initial simulated spear phishing message, and/or otherwise interacting with the initial simulated spear phishing message. Additionally or alternatively, the first enterprise user device 120 may receive information indicating how many times the first user replies to the simulated spear phishing messages, whether the first user forwarded the simulated spear phishing messages, whether and/or how the first user selected different elements included in the simulated spear phishing messages, whether and/or how the first user reported the simulated spear phishing messages, whether and/or how the first user falls for the simulated spear phishing messages after defusing and/or reporting the simulated spear phishing messages, and/or other user interaction information.

Figure 2B:
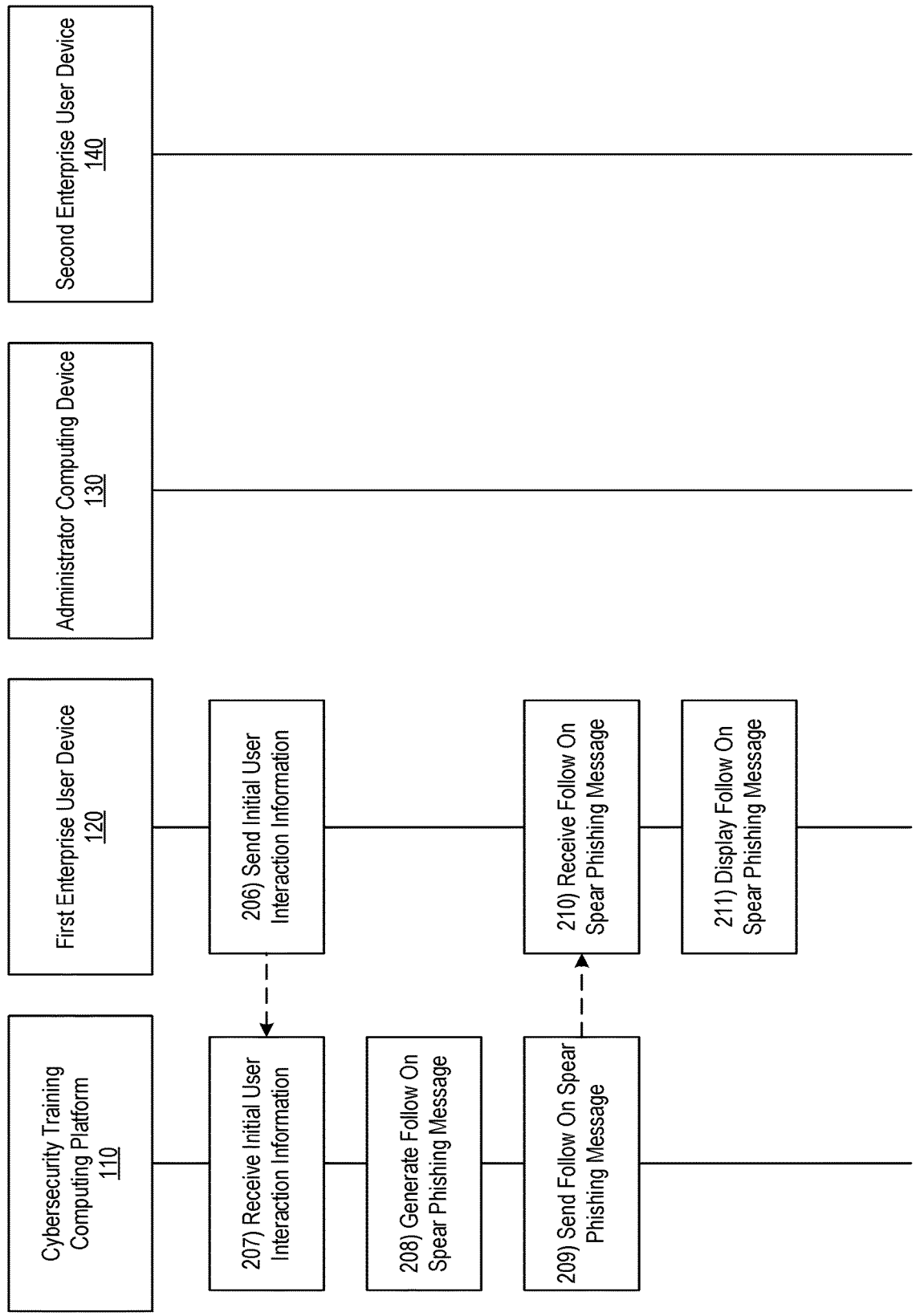

Referring to FIG. 2B, at step 206, first enterprise user device 120 may send, share, or otherwise provide initial user interaction information, based on the user input received at step 205, to the cybersecurity training computing platform 110. In some instances, in sending the initial user interaction information, the first enterprise user device 120 may send information indicating a response to the initial simulated spear phishing message, a manner in which the first user interacted with the initial simulated spear phishing message (e.g., reply, forward, delete, ignore, or other interaction), and/or other information relating to an interaction between the first user and the initial simulated spear phishing message. Additionally or alternatively, the first enterprise user device 120 may send information indicating how many times the first user replies to the simulated spear phishing messages, whether the first user forwarded the simulated spear phishing messages, whether and/or how the first user selected different elements included in the simulated spear phishing messages, whether and/or how the first user reported the simulated spear phishing messages, whether and/or how the first user falls for the simulated spear phishing messages after defusing and/or reporting the simulated spear phishing messages, and/or other user interaction information. In some instances, in addition to sending the initial user interaction information, the first enterprise user device 120 may send temporal information corresponding to the initial simulated spear phishing message (e.g., how long did the first user take to interact with the initial simulated spear phishing message).

At step 207, the cybersecurity training computing platform 110 may receive or otherwise access the initial user interaction information, sent at step 206, from the first enterprise user device 120. In some instances, in receiving the initial user interaction information, the cybersecurity training computing platform 110 may receive information indicating a response to the initial simulated spear phishing message, a manner in which the first user interacted with the initial simulated spear phishing message (e.g., reply, forward, delete, ignore, or other interaction), and/or other information relating to an interaction between the first user and the initial simulated spear phishing message. In some instances, in receiving the initial user interaction information, the cybersecurity training computing platform 110 may receive information indicating how many times the first user replies to the simulated spear phishing messages, whether the first user forwarded the simulated spear phishing messages, whether and/or how the first user selected different elements included in the simulated spear phishing messages, whether and/or how the first user reported the simulated spear phishing messages, whether and/or how the first user falls for the simulated spear phishing messages after defusing and/or reporting the simulated spear phishing messages, and/or other user interaction information. In some instances, in addition to receiving the initial user interaction information, the cybersecurity training computing platform 110 may receive temporal information corresponding to the initial simulated spear phishing message (e.g., how long did the first user take to interact with the initial simulated spear phishing message).

At step 208, the cybersecurity training computing platform 110 may generate a follow on simulated spear phishing message. For example, the cybersecurity training computing platform 110 may input the initial user interaction information and/or temporal information, received at step 207, into a machine learning model. In this example, the machine learning model may include a series of branching templates that may be used to generate the follow on simulated spear phishing message (or messages). In some instances, if the initial user interaction information contains content of a reply to the initial simulated spear phishing message, the cybersecurity training computing platform 110 may use one or more natural language processing (NLP) and/or natural language understanding (NLU) techniques to pre-process the initial user interaction information prior to inputting it into the machine learning model.

In some instances, the cybersecurity training computing platform 110 may generate the series of branching templates based on user input (e.g., received from administrator computing device 130). Additionally or alternatively, the cybersecurity training computing platform 110 may automatically generate the series of branching templates based on historical interaction information (e.g., for the first user, the enterprise organization, a subset of individuals in the enterprise organization (who may, e.g., be grouped by a job title, performance level, or other identifying metrics), and/or other individuals). Additionally or alternatively, the cybersecurity training computing platform 110 may generate the series of branching templates based on historical cybersecurity training information for the first user (e.g., what training modules has the first user completed, how did the first user perform in these training modules, and/or other training module interaction data for the first user). Additionally or alternatively, the cybersecurity training computing platform 110 may generate the series of branching templates based on an industry corresponding to the enterprise organization. In some instances, the cybersecurity training computing platform 110 may dynamically update the series of branching templates based on changes in any of the above described information and/or based on information for other users (e.g., other employees of the enterprise organization). For example, the cybersecurity training computing platform 110 may dynamically update the series of branching templates based on interactions of these other users with cybersecurity and/or spear phishing training modules (e.g., the branching templates may be updated to include more sophisticated spear phishing messages as an overall level of spear phishing awareness is increased within the enterprise organization due to participation in cybersecurity training modules).

In some instances, in generating the follow on simulated spear phishing message, the cybersecurity training computing platform 110 may generate a customized message prompting the first user to input personal information, navigate to another webpage, or perform other interactive actions. In some instances, in generating the follow on simulated spear phishing message, the cybersecurity training computing platform 110 may generate an email, SMS message, or other message. In some instances, in generating the follow on simulated spear phishing message, the cybersecurity training computing platform 110 may generate a message that includes a malicious email address, includes a malicious link, requests personal information, and/or includes one or more other indications that the follow on simulated spear phishing message is sent from a malicious actor. In some instances, the cybersecurity training computing platform 110 may generate a message that requests personal information, requests tasks to be performed, or requests other actions that may appear suspect to the recipient (e.g., which may be more suspicious than the soft opener used in the initial simulated spear phishing message generated at step 201).

In using these branching templates to generate the follow on simulated spear phishing message, the cybersecurity training computing platform 110 may efficiently generate customized messages for the first user that are additionally based on the content and/or manner of the first user's response to the initial simulated spear phishing message. For example, the cybersecurity training computing platform 110 may generate a follow on simulated spear phishing message that targets a weakness of the first user, identified based on the initial user interaction information. Additionally or alternatively, the cybersecurity training computing platform 110 may generate the follow on simulated spear phishing message based on an amount of time taken to respond to the initial simulated spear phishing message (e.g., if the first user took more than a threshold amount of time to respond, he or she may be more aware of spear phishing threats, and thus a message that is more sophisticated and/or difficult to recognize may be generated as the follow on simulated spear phishing message for the first user, relative to a message that may be generated for another user who took less than the threshold amount of time to respond).

In some instances, in generating the follow on simulated spear phishing message, the cybersecurity training computing platform 110 may generate a follow on simulated spear phishing message that is of a different format than the initial simulated spear phishing message (e.g., the initial simulated spear phishing message may have been an email, whereas the follow on simulated spear phishing message may be a text message). In doing so, the cybersecurity training computing platform 110 may simulate realistic spear phishing scenarios where an attacker may have access to additional contact information for a recipient and may attack via different channels, such as email and text message channels.

At step 209, the cybersecurity training computing platform 110 may send, share, or otherwise provide the follow on simulated spear phishing message generated at step 208. For example, the cybersecurity training computing platform 110 may send the follow on simulated spear phishing message to the first enterprise user device 120. In some instances, the cybersecurity training computing platform 110 may send the initial simulated spear phishing message to an electronic messaging server that may be accessed by the first enterprise user device 120.

At step 210, the first enterprise user device 120 may receive or otherwise access the follow on simulated spear phishing message from the cybersecurity training computing platform 110. In some instances, the first enterprise user device 120 may receive the follow on simulated spear phishing message from an electronic messaging server that may be accessed by the first enterprise user device 120.

Figure 4:
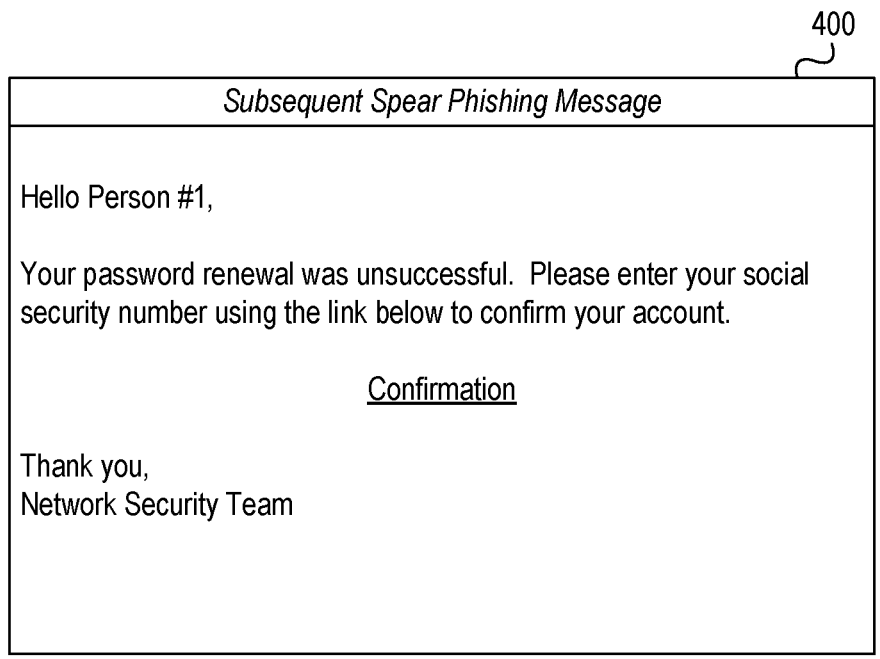

At step 211, the first enterprise user device 120 may display the follow on simulated spear phishing message received at step 210. For example, the first enterprise user device 120 may display a graphical user interface similar to graphical user interface 400, which is shown in FIG. 4. For example, the first enterprise user device 120 may prompt the first user to input a social security number, credit card information, account information, and/or other personal information. Additionally or alternatively, the first enterprise user device 120 may prompt the first user to select a malicious link, perform a task, or otherwise prompt for the first user for some action. In some instances, the first enterprise user device 120 may receive user input and/or detect temporal information corresponding to the first user interacting with the follow on simulated spear phishing message.

Referring to FIG. 2C, at step 212, the first enterprise user device 120 may send, share, or otherwise provide subsequent user interaction information, based on user input received at step 211, to the cybersecurity training platform 110. In some instances, in sending the subsequent user interaction information, the first enterprise device 120 may send information indicating a response to the follow on simulated spear phishing message, a manner in which the first user interacted with the follow on simulated spear phishing message (e.g., reply, forward, delete, ignore, or other interaction), and/or other information relating to an interaction between the first user and the follow on simulated spear phishing message. Additionally or alternatively, the first enterprise user device 120 may send information indicating how many times the first user replies to the simulated spear phishing messages, whether the first user forwarded the simulated spear phishing messages, whether and/or how the first user selected different elements included in the simulated spear phishing messages, whether and/or how the first user reported the simulated spear phishing messages, whether and/or how the first user falls for the simulated spear phishing messages after defusing and/or reporting the simulated spear phishing messages, and/or other user interaction information. In some instances, in addition to sending the subsequent user interaction information, the first enterprise device 120 may send temporal information corresponding to the follow on simulated spear phishing message (e.g., how long did the first user take to interact with the follow on simulated spear phishing message).

At step 213, the cybersecurity training computing platform 110 may receive or otherwise access the subsequent user interaction information sent at step 212. For example, the cybersecurity training computing platform 110 may receive information indicating a response to the follow on simulated spear phishing message, a manner in which the first user interacted with the follow on simulated spear phishing message (e.g., reply, forward, delete, ignore, or other interaction), and/or other information relating to an interaction between the first user and the follow on simulated spear phishing message. Additionally or alternatively, in receiving the subsequent user interaction information, the cybersecurity training platform 110 may receive information indicating how many times the first user replies to the simulated spear phishing messages, whether the first user forwarded the simulated spear phishing messages, whether and/or how the first user selected different elements included in the simulated spear phishing messages, whether and/or how the first user reported the simulated spear phishing messages, whether and/or how the first user falls for the simulated spear phishing messages after defusing and/or reporting the simulated spear phishing messages, and/or other user interaction information. In some instances, in addition to receiving the subsequent user interaction information, the cybersecurity training computing platform 110 may receive temporal information corresponding to the follow on simulated spear phishing message. In some instances, the cybersecurity training computing platform 110 may repeat steps 208-213 to collect additional user interaction information while progressing through the series of branching templates.

At step 214, the cybersecurity training computing platform 110 may compute a spear phishing score based on the initial user interaction information (received at step 207) and the subsequent user interaction information (received at step 213). For example, the cybersecurity training computing platform 110 may host a spear phishing score calculation algorithm, and may use the spear phishing score calculation algorithm to compute the spear phishing score.

As one illustrative example, the cybersecurity training computing platform 110 may compute the spear phishing score based on method of response to the initial/follow on simulated spear phishing messages, content of the response to the initial/follow on simulated spear phishing messages, temporal information related to interaction with the initial/ follow on simulated spear phishing messages, and/or other collected information. For example, the cybersecurity training computing platform 110 may assign a first value to the first individual based on a type of response to the initial simulated spear phishing message (which may, e.g., be included in the initial user interaction information). In this example, the cybersecurity training computing platform 110 may assign a second value to the first user based on a time difference between sending the initial simulated spear phishing message and receiving the initial user interaction information (e.g., temporal information corresponding to the initial simulated spear phishing message). Additionally, the cybersecurity training computing platform 110 may assign a third value to the first user based on a type of response to the follow on simulated spear phishing message (which may be included in the subsequent user interaction information). In some instances, the cybersecurity training computing platform 110 may assign a fourth value based on a time difference between sending the follow on simulated spear phishing message and receiving the subsequent user interaction information (e.g., temporal information corresponding to the follow on simulated spear phishing message). After assigning these values to the first user, the cybersecurity training computing platform 110 may apply the spear phishing scoring algorithm using the first value, the second value, the third value, and the fourth value. In some instances, in applying the spear phishing scoring algorithm, the cybersecurity training computing platform 110 may apply the following algorithm: spear phishing score=$\alpha$(first value+third value)+$\beta$(second value+third value), where $\alpha$ is a first weight value, and $\beta$ is a second weight value. In one or more instances, the cybersecurity training computing platform may dynamically identify $\alpha$ and $\beta$ based on receipt of the initial user interaction information. In some instances, in computing the spear phishing score, the cybersecurity training computing platform 110 may compute a numeric value between 0 and 100 indicating a susceptibility to a spear phishing attack, with 0 being the least likely to fall for the attack and 100 being most likely to fall for the attack.

Accordingly, by computing the spear phishing score in this manner, the cybersecurity training computing platform 110 may effectively cause different user reactions to the simulation spear phishing messages to result in different levels of failure. For example, the cybersecurity training computing platform 110 may determine a more severe level of failure if the first user responds to the simulated spear phishing messages than if the first user merely forwards the simulated spear phishing messages. As additional examples, the cybersecurity training computing platform 110 may assign the first and/or third values for the spear phishing scoring algorithm based on how many times the first user replies to the simulated spear phishing messages, whether the first user forwarded the simulated spear phishing messages, whether and/or how the first user selected different elements included in the simulated spear phishing messages, whether and/or how the first user reported the simulated spear phishing messages, whether and/or how the first user falls for the simulated spear phishing messages after defusing and/or reporting the simulated spear phishing messages, and/or other user interaction information. By operating in this manner the cybersecurity training computing platform 110 may identify more nuanced levels of failure (e.g., attributing different levels of failure to different types of interactions) rather than considering any input a failure (e.g., a binary decision of pass or fail based on whether or not a user responded to a spear phishing message).

In some instances, the cybersecurity training computing platform 110 may compute an individual spear phishing score (e.g., using the algorithm described above or another spear phishing scoring algorithm) for the first user. Additionally or alternatively, the cybersecurity training computing platform 110 may compute one or more aggregate spear phishing scores (e.g., for all employees of the enterprise organization, all employees in a particular group within the enterprise organization, or another subset of employees within the enterprise organization). In some instances, the cybersecurity training computing platform 110 may compute these aggregate spear phishing scores by averaging the spear phishing scores for a plurality of employees within the enterprise organization. In some instances, the cybersecurity training computing platform 110 may weigh the individual spear phishing scores for the different employees differently based on a tenure within the enterprise organization, job titles, group/department memberships, and/or other defining characteristics of the employees.

At step 215, the cybersecurity training computing platform 110 may compare the one or more spear phishing scores (computed at step 214) to one or more predetermined spear phishing score ranges and/or thresholds. For example, the cybersecurity training computing platform 110 may set a first spear phishing score range of 0-50 and a second spear phishing score range of 51-100. In some instances, the cybersecurity training computing platform 110 may compare the one or more spear phishing scores to these ranges, and may proceed based on results of the comparison. In some instances, the cybersecurity training computing platform 110 may compare a spear phishing score corresponding to the target audience of a customized training module (e.g., individual score for individual modules, group scores for group modules, or other scores for other target audiences).

In some instances, if the cybersecurity training computing platform 110 determines that the spear phishing score is in the first spear phishing score range, the cybersecurity training computing platform 110 may determine that a customized training module should not be generated (e.g., because the first user is not likely susceptible to a spear phishing attack), and may proceed to step 220. If the cybersecurity training computing platform 110 determines that the spear phishing score is in the second spear phishing score range, the cybersecurity training computing platform 110 may determine that a customized training module should be generated, and may proceed to step 216. In some instances, the cybersecurity training computing platform 110 may have one or more intervening spear phishing score ranges, and may adjust parameters for the customized training modules based on these ranges. For example, the cybersecurity training computing platform 110 may set third and fourth spear phishing score ranges as 51-75 and 76-100 respectively. In this example, if the cybersecurity training computing platform 110 determines that the spear phishing score is within the third spear phishing score range, the cybersecurity training computing platform 110 may determine that the customized training module may be optional, whereas if the cybersecurity training computing platform 110 determines that the spear phishing score is within the fourth spear phishing score range, the cybersecurity training computing platform 110 may determine that the customized training module may be compulsory (e.g., because the first user may be more vulnerable to spear phishing attacks in these instances, and training may be of greater importance).

At step 216, the cybersecurity training computing platform 110 may generate a customized training module based on the initial user interaction information, subsequent user interaction information, and/or any corresponding temporal information. For example, the cybersecurity training computing platform 110 may generate a customized training module to train the first user based on identified areas of susceptibility to a spear phishing attack. Specifically, if the first user failed to recognize that the sender address for the messages corresponded to a simulated bad actor, the cybersecurity training computing platform 110 may generate a customized training module that may train the first individual on recognition of potentially malicious email addresses. In doing so, the cybersecurity training computing platform 110 may use machine learning to generate a customized training module that would be most effective in improving the first user's ability to recognize and avoid falling for a spear phishing message.

Figure 2D:
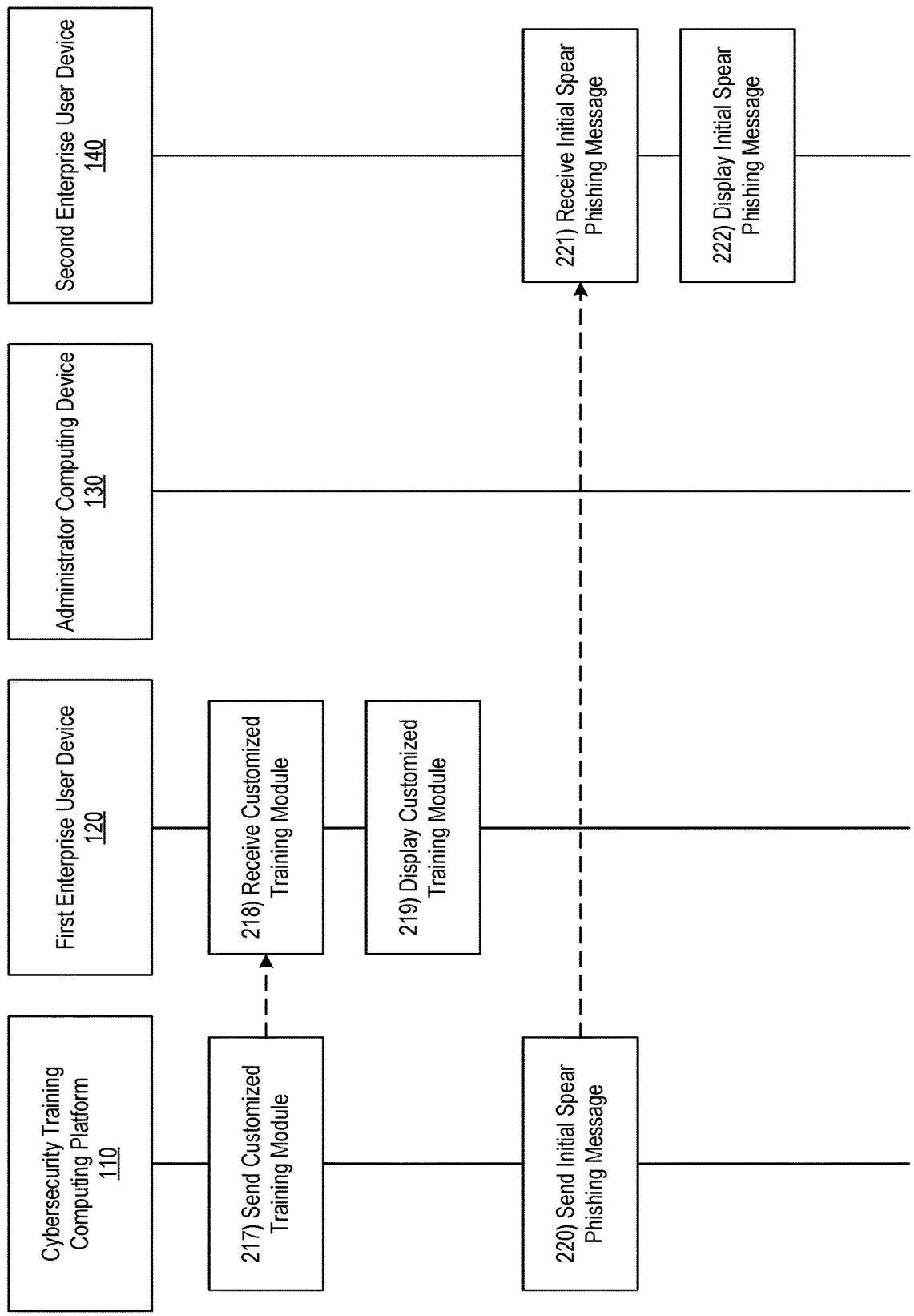

Referring to FIG. 2D, at step 217, the cybersecurity training computing platform 110 may send, share, or otherwise provide the customized training module to the first enterprise user device 120. In some instances, the cybersecurity training computing platform 110 may send a message including a link to the customized training module to the first enterprise user device 120 or another computing device at which the first enterprise user device 120 may access the message (e.g., an electronic messaging server, or other computing device).

At step 218, the first enterprise user device 120 may receive or otherwise access the customized training module from the cybersecurity training computing platform 110. In some instances, the first enterprise user device 120 may receive a message including a link to the customized training module from the cybersecurity training computing platform 110 or another computing device at which the first enterprise user device 120 may access the message (e.g., an electronic messaging server, or other computing device).

Figure 5:
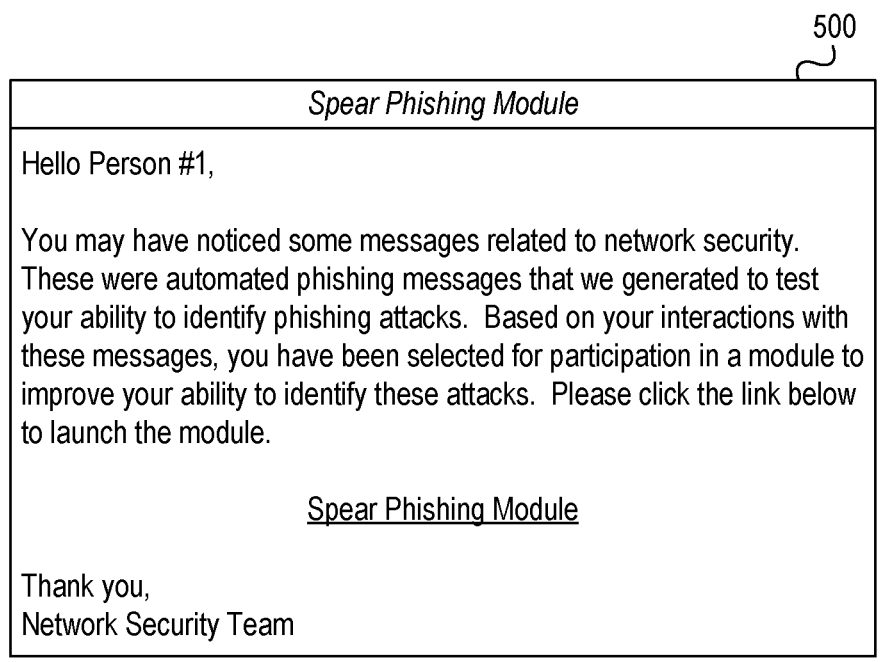

At step 219, the first enterprise user device 120 may display the customized training module received at step 218. In some instances, the first enterprise user device 120 may display a message including a link to the customized training module. For example, the first enterprise user device may display a graphical user interface similar to graphical user interface 500, which is shown in FIG. 5. In some instances, the first enterprise user device 120 may display the customized training module based on or in response to the communication from the cybersecurity training computing platform 110 sent at step 217.

At step 220, the cybersecurity training computing platform 110 may send, share, or otherwise provide an initial simulated spear phishing message to the second enterprise user device 140. In some instances, the initial simulated spear phishing message may be the initial simulated spear phishing message generated at step 201. In other instances, the cybersecurity training computing platform 110 may generate a new initial simulated spear phishing message (e.g., using one or more of the methods described above at step 201). In some instances, actions performed at step 220 may be similar to those described above at step 202 with regard to the first enterprise user device 120.

At step 221, the second enterprise user device 140 may receive or otherwise access the initial simulated spear phishing message sent at step 220. In some instances, actions performed at step 221 may be similar to those described above at step 203 with regard to the first enterprise user device 120.

At step 222, the second enterprise user device 140 may display the initial simulated spear phishing message received at step 221. In some instances, the second enterprise user device 140 may perform similar actions to those described above at step 204 with regard to the first enterprise user device 120.

Figure 2E:
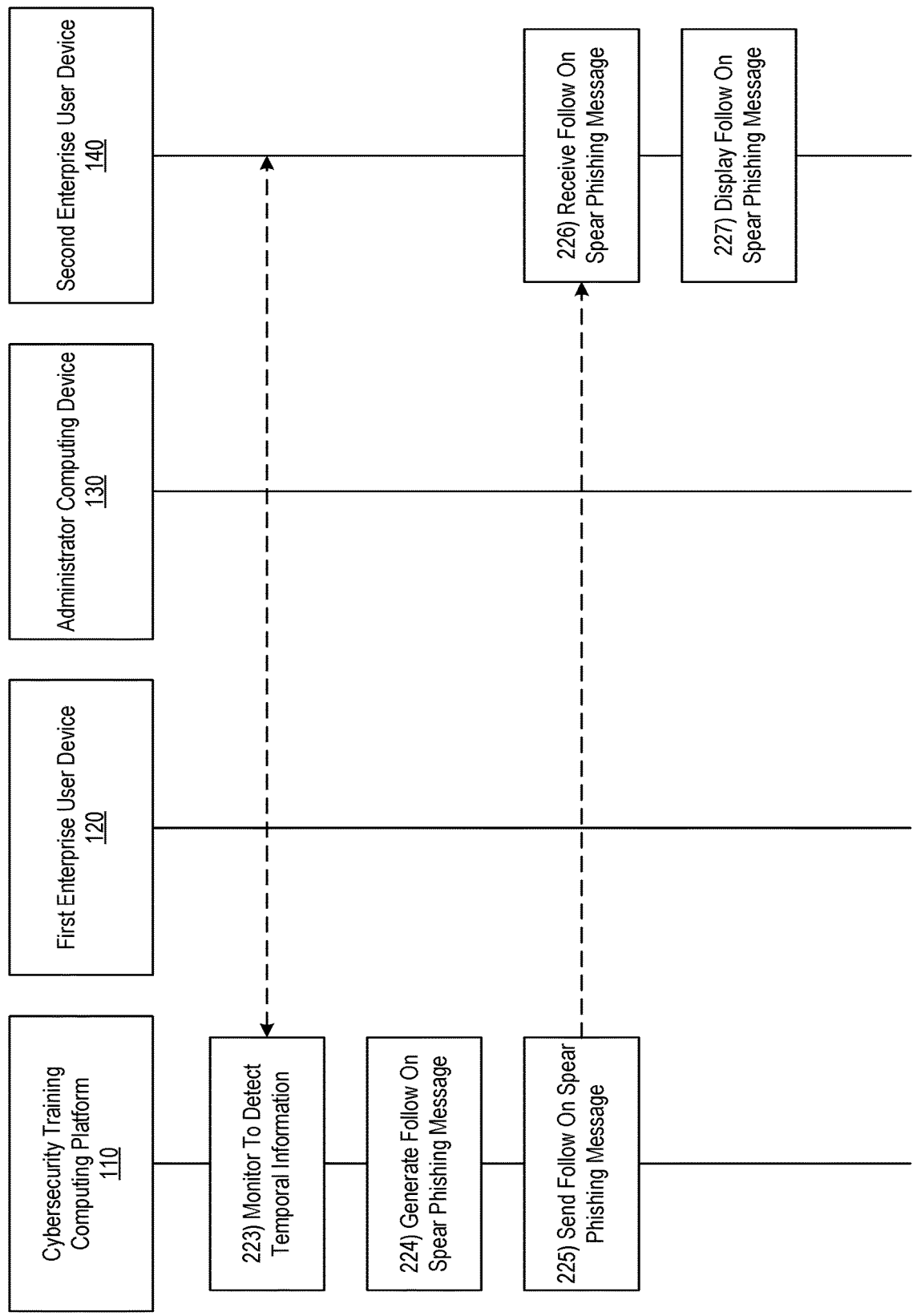

Referring to FIG. 2E, at step 223, the cybersecurity training computing platform 110 may monitor the second enterprise user device 140 to detect temporal information. For example, the cybersecurity training computing platform 110 may detect that a predetermined period of time has elapsed since sending the initial simulated spear phishing message, and that no initial user interaction information has been received.

At step 224, the cybersecurity training computing platform 110 may generate a follow on simulated spear phishing message. For example, the cybersecurity training computing platform 110 may generate the follow on simulated spear phishing message based on or in response to the temporal information detected at step 223. In some instances, in generating the follow on simulated spear phishing message, the cybersecurity training computing platform 110 may generate a message similar to the follow on simulated spear phishing message generated at step 208. In some instances, in generating the follow on simulated spear phishing message based on the temporal information, the cybersecurity training computing platform 110 may generate a spear phishing message that is more difficult to identify as a spear phishing message than the initial simulated spear phishing message. For example, the cybersecurity training computing platform 110 may determine that the second user was not deceived by the initial simulated spear phishing message, and that another spear phishing message should be sent that is more difficult to identify. Additionally or alternatively, the cybersecurity training computing platform 110 may generate a follow on simulated spear phishing message that contains a more urgent ask than the initial simulated spear phishing message, which may cause the second user to respond to the follow on simulated spear phishing message (whereas he or she did not respond to the initial simulated spear phishing message). In some instances, in generating the follow on simulated spear phishing message, the cybersecurity training computing platform 110 may use the series of branching templates described above at step 208. For example, in storing the series of branching templates, the cybersecurity training computing platform 110 may store a series of templates that should be implemented in spear phishing message generation when user interaction information is not received.

At step 225, the cybersecurity training computing platform 110 may send, share, or otherwise provide the follow on simulated spear phishing message, generated at step 224, to the second enterprise user device 140. In some instances, actions performed at step 225 may be similar to those described above at step 209 with regard to the first enterprise user device 120.

At step 226, the second enterprise user device 140 may receive or otherwise access the follow on simulated spear phishing message sent at step 225. In some instances, actions performed at step 226 may be similar to those described above at step 210 with regard to the first enterprise user device 120.

At step 227, the second enterprise user device 140 may display the follow on simulated spear phishing message received at step 226. In some instances, although the second enterprise user device 140 might not have received a user input corresponding to the initial simulated spear phishing message displayed at step 222, the second enterprise user device 140 may receive a user input corresponding to the follow on simulated spear phishing message. In these instances, the second enterprise user device 140 may proceed to step 228. In other instances, the second enterprise user device 140 might not receive a user input corresponding to the follow on simulated spear phishing message, and thus may proceed to step 230 without sending user interaction information. In these instances, the cybersecurity training computing platform 110 may monitor the second enterprise user device 140 for temporal information as described above at step 223. In some instances, actions performed at step 227 may be similar to those described above with regard to the first enterprise user device 120 at step 211.

Figure 2F:
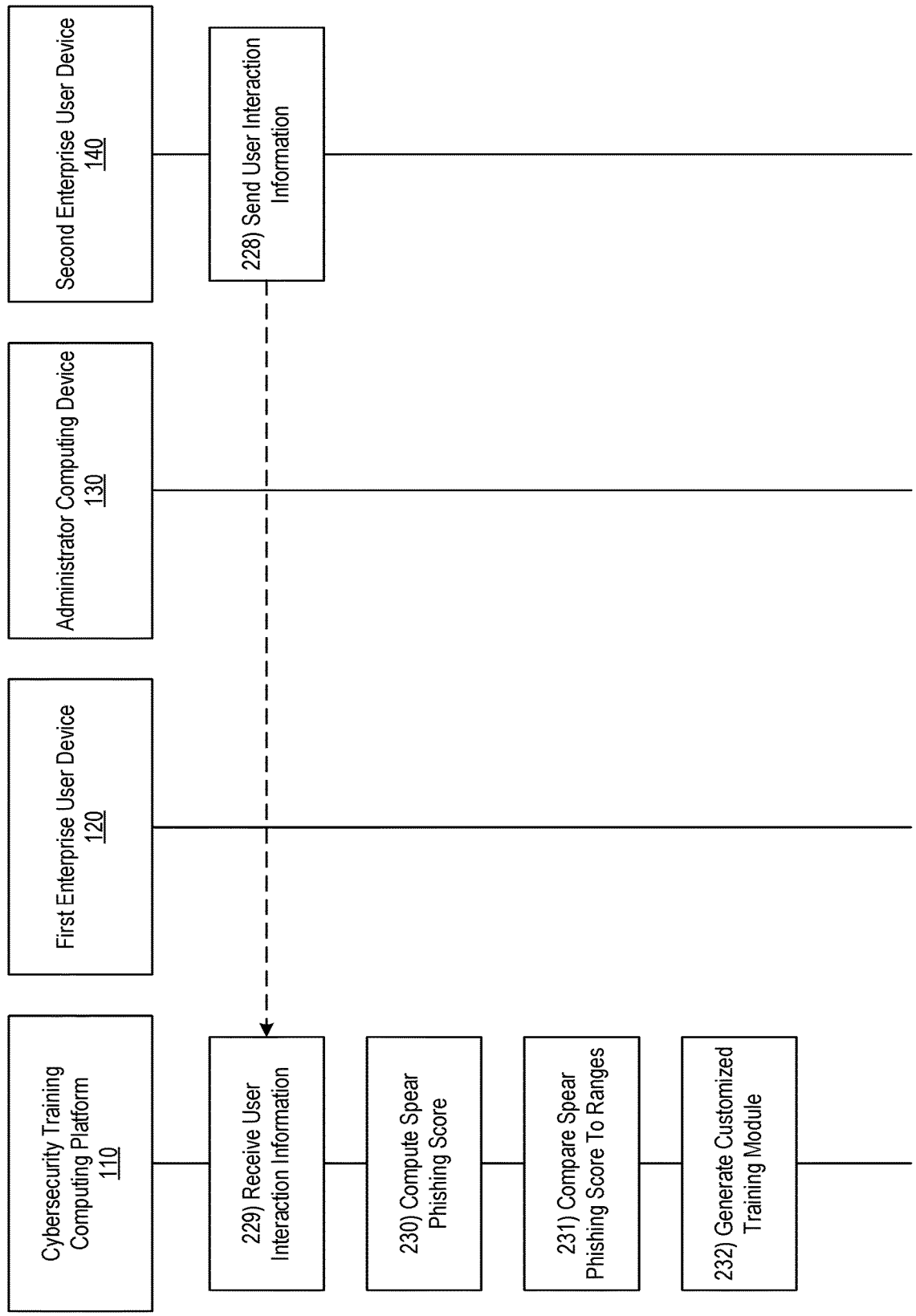

Referring to FIG. 2F, at step 228, the second enterprise user device 140 may send, share, or otherwise provide user interaction information to the cybersecurity training computing platform 110. In some instances, in sending the user interaction information to the cybersecurity training computing platform, the second enterprise user device 140 may send information corresponding to the user input received at step 227. In some instances, actions performed at step 228 may be similar to those described above with regard to the first enterprise user device 120 at steps 206 and/or 212.

At step 229, the cybersecurity training computing platform 110 may receive or otherwise access the user interaction information sent at step 228. In some instances, the cybersecurity training computing platform 110 may repeat steps 225-229 one or more times to collect additional user interaction and/or temporal information. In some instances, actions performed at step 229 may be similar to those described above with regard to the first enterprise user device 120 at steps 207 and 213.

At step 230, the cybersecurity training computing platform may compute one or more spear phishing scores. For example, the cybersecurity training computing platform 110 may compute an individual spear phishing score for the second user and/or compute/update aggregate spear phishing scores for one or more groups corresponding to the second user (e.g., the enterprise organization, a department within the enterprise organization, and/or other subsets of individuals within the enterprise organization). In some instances, where temporal information was detected by the cybersecurity training computing platform 110 (and initial user interaction information was not received), the cybersecurity training computing platform 110 may assign a value of 0 as the first value in the above described spear phish scoring algorithm. In some instances, actions performed at step 230 may be similar to those described above at step 214 with regard to the spear phishing score for the first user.

At step 231, the cybersecurity training computing platform 110 may compare the one or more spear phishing scores computed at step 230 to the one or more predetermined spear phishing score ranges and/or thresholds. In some instances, actions performed at step 231 may be similar to those described above at step 215 with regard to the spear phishing scores corresponding to the first enterprise user device 120.

At step 232, the cybersecurity training computing platform 110 may generate a customized training module based on the temporal information (detected at step 223), the user interaction information (received at step 229), and/or the comparison of the spear phishing scores to the predetermined spear phishing score ranges and/or thresholds (performed at step 231). Actions performed at step 232 may be similar to those described above at step 216 with regard to the customized training module for the first user.

Figure 2G:
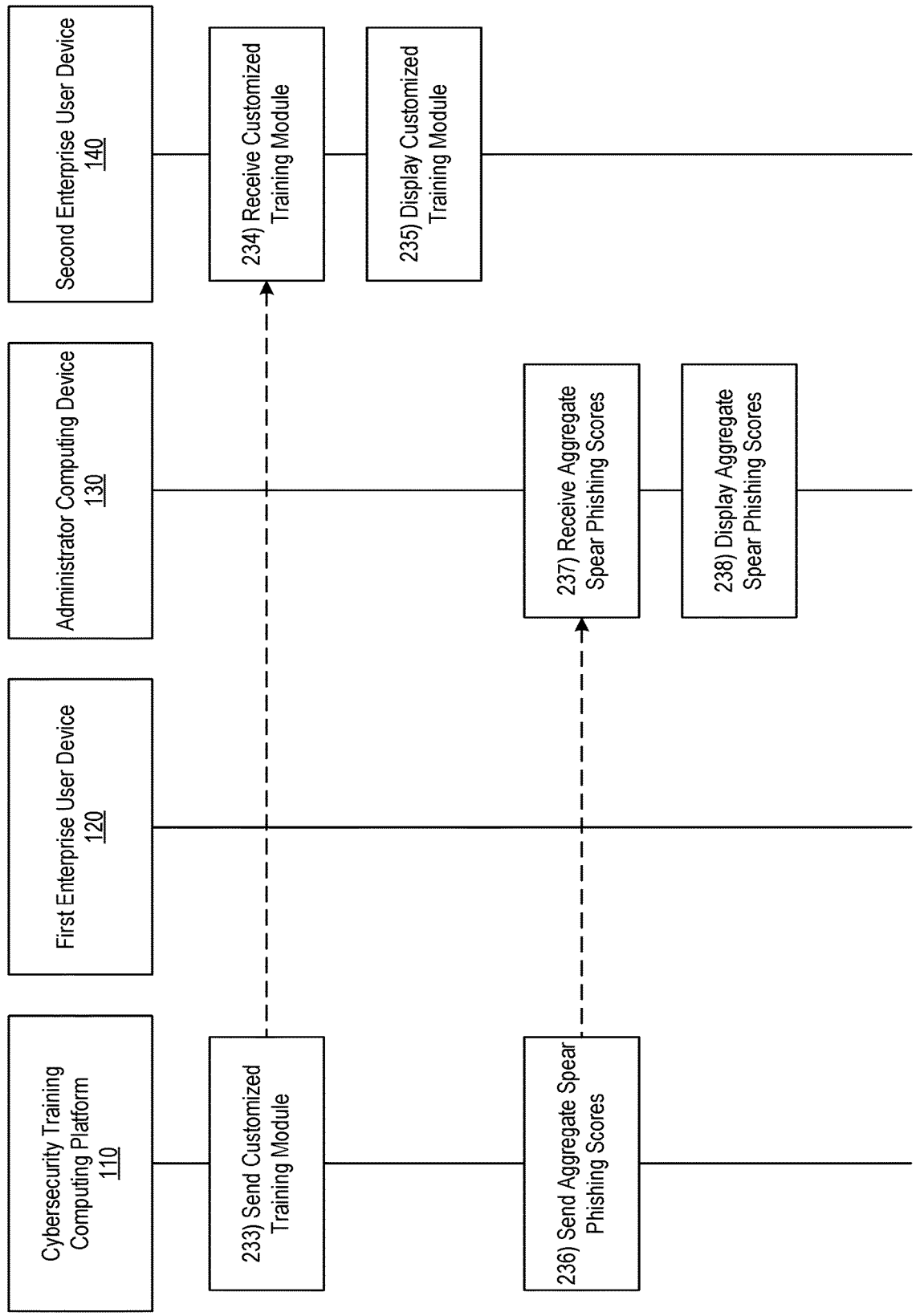

Referring to FIG. 2G, at step 233, the cybersecurity training computing platform 110 may send, share, or otherwise provide the customized training module, generated at step 232, to the second enterprise user device 140. Actions performed at step 233 may be similar to those described above at step 217 with regard to the first enterprise user device 120.

At step 234, the second enterprise user device 140 may receive or otherwise access the customized training module sent at step 233. Actions performed at step 233 may be similar to those described above at step 218 with regard to the first enterprise user device 120.

At step 235, the second enterprise user device 140 may display the customized training module received at step 234. Actions performed at step 235 may be similar to those described above at step 219 with regard to the first enterprise user device 120.

At step 236, the cybersecurity training computing platform 110 may send, share, or otherwise provide one or more aggregate spear phishing scores (e.g., computed and/or updated at steps 214 and 230) to the administrator computing device 130. In some instances, in sending the one or more aggregate spear phishing scores, the cybersecurity training computing platform 110 may send one or more scores indicating how susceptible one or more individuals and/or groups of individuals are to a spear phishing attack in the aggregate (e.g., the enterprise organization as a whole, a department, employees in a particular role, and/or another subset of employees of the enterprise organization). In some instances, along with the aggregate spear phishing scores, the cybersecurity training computing platform 110 may send one or more commands directing the administrator computing device 130 to display the aggregate spear phishing scores.

At step 237, the administrator computing device 130 may receive or otherwise access the aggregate spear phishing scores sent at step 236. In some instances, the administrator computing device 130 may receive, along with the aggregate spear phishing scores, the one or more commands directing the administrator computing device 130 to display the aggregate spear phishing scores.

At step 238, the administrator computing device 130 may display the aggregate spear phishing scores based on or in response to the one or more commands directing the administrator computing device 130 to display the aggregate spear phishing scores. In some instances, based on these aggregate spear phishing scores, the administrator computing device 130 may cause one or more network security policies to be applied and/or cause customized training modules to be deployed to one or more individuals corresponding to the aggregate spear phishing scores.

It should be understood that the steps described in the illustrative event sequence herein may be performed in any alternative sequence or order without departing from the scope of the disclosure. Furthermore, although a single client device and enterprise user device are described, it should be understood that any number of devices may be involved in the methods described herein.

Figure 6:
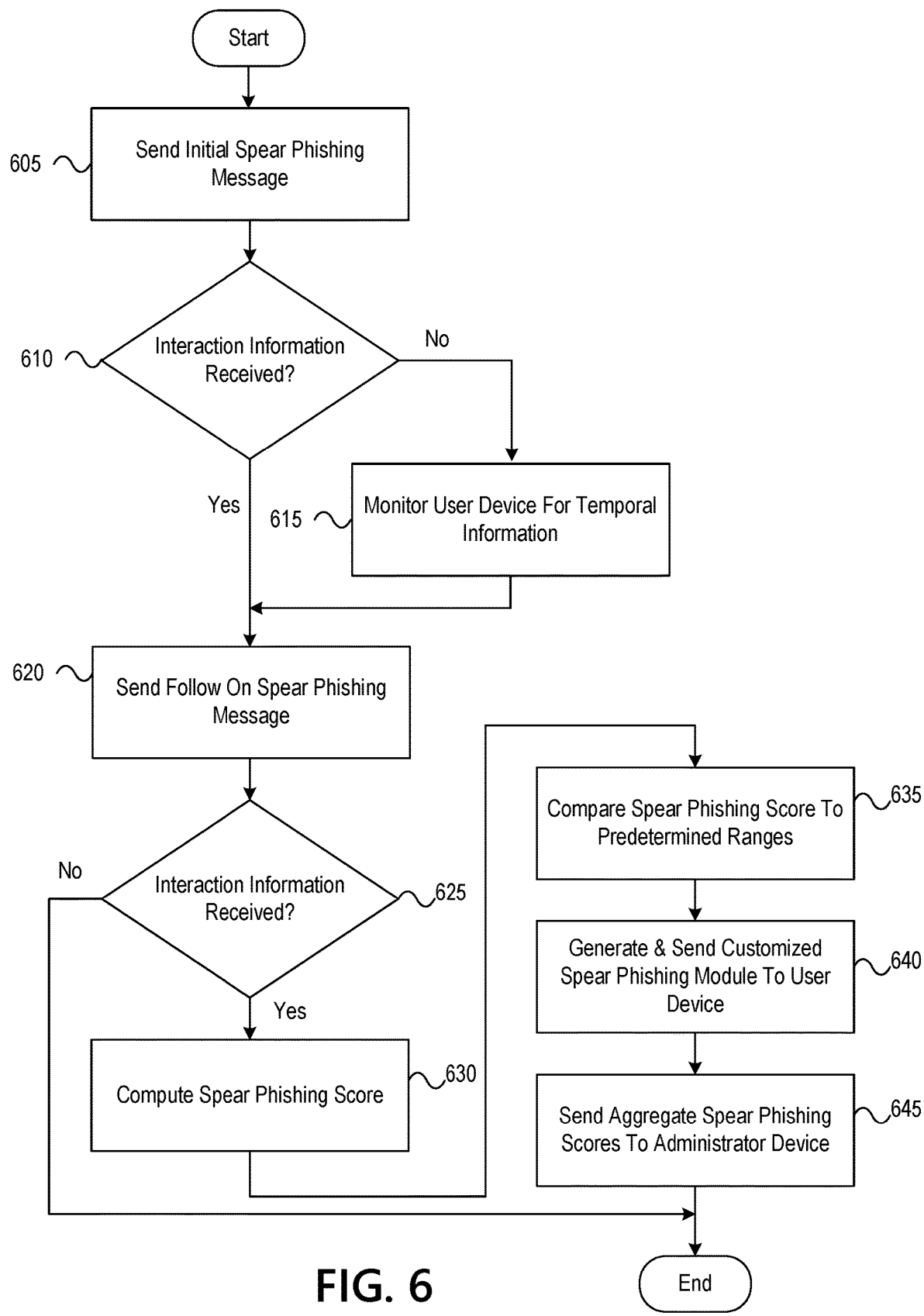
FIG. 6 depicts an illustrative method for applying machine learning in simulated spear phishing in accordance with one or more example embodiments.

FIG. 6 depicts an illustrative method for applying machine learning in simulated spear phishing in accordance with one or more example embodiments. Referring to FIG. 6, at step 605, a computing platform having at least one processor, a communication interface, and memory may send an initial simulated spear phishing message to an enterprise user device. At step 610, the computing platform may identify whether or not interaction information was received from the enterprise user device. If user interaction information was not received, the computing platform may proceed to step 615. If interaction information was received, the computing platform may proceed to step 620.

At step 615, the computing platform may monitor the enterprise user device for temporal information. At step 620, the computing platform may send a follow on simulated spear phishing message to the enterprise user device. At step 625, the computing platform may identify whether interaction information was received from the enterprise user device. If interaction information was not received, the method may end. If interaction information was received, the computing platform may proceed to step 630.

At step 630, the computing platform may compute a spear phishing score based on the interaction and/or temporal information. At step 635, the computing platform may compare the spear phishing score to one or more predetermined ranges. At step 640, based on the comparison of the spear phishing score to the one or more predetermined ranges and further based on the user interaction and/or temporal information, the computing platform may generate and send a customized spear phishing module to the enterprise user device. At step 645, the computing platform may send one or more aggregate spear phishing scores to an administrator computing device.

It should be understood that the analysis processes, method steps, and/or methods described herein may be performed in different orders and/or in alternative arrangements from those illustrated herein, without departing from the scope of this disclosure. Additionally or alternatively, one or more of the analysis processes, method steps, and/or methods described herein may be optional and/or omitted in some arrangements, without departing from the scope of this disclosure.

One or more aspects of the disclosure may be embodied in computer-usable data or computer-executable instructions, such as in one or more program modules, executed by one or more computers or other devices to perform the operations described herein. Program modules may include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

One or more aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). The one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor;
   a communication interface communicatively coupled to the at least one processor; and
   memory storing computer-readable instructions that, when executed by the at least one processor, cause the computing platform to:
   send, to a first enterprise user device, an initial simulated spear phishing electronic message;
   receive, from the first enterprise user device, initial user interaction information indicating a manner in which a user of the first enterprise user device interacted with the initial simulated spear phishing electronic message;
   execute a machine learning model employing a series of branching message templates, wherein executing the machine learning model includes using, as inputs, the initial user interaction information indicating the manner in which the user of the first enterprise user device interacted with the initial simulated spear phishing electronic message to output one or more first follow on simulated spear phishing electronic messages, wherein the one or more first follow on simulated spear phishing electronic messages are customized to target a weakness of the user based on the initial user interaction information indicating the manner in which the user of the first enterprise user device interacted with the initial simulated spear phishing electronic message;
   send, to the first enterprise user device, the one or more first follow on simulated spear phishing electronic messages;
   receive, from the first enterprise user device, first additional user interaction information indicating a manner in which the user of the first enterprise user device interacted with the one or more first follow on simulated spear phishing electronic messages;
   compute, based on the initial user interaction information indicating the manner in which the user of the first enterprise user device interacted with the initial simulated spear phishing electronic message and the first additional user interaction information indicating the manner in which the user of the first enterprise user device interacted with the one or more first follow on simulated spear phishing electronic messages, one or more spear phishing scores corresponding to the user of the first enterprise user device, wherein computing the one or more spear phishing scores corresponding to the user of the first enterprise user device comprises:
   assigning a first value based on a type of response to the initial simulated spear phishing electronic message;
   assigning a second value based on a time difference between sending the initial simulated spear phishing electronic message and receiving the initial user interaction information;
   assigning a third value based on a type of response to the one or more first follow on simulated spear phishing electronic messages;
   assigning a fourth value based on a time difference between sending the one or more first follow on simulated spear phishing electronic messages and receiving the first additional user interaction information; and
   applying, using the first value, the second value, the third value, and the fourth value, a spear phishing scoring algorithm, wherein:
   the spear phishing scoring algorithm comprises:

spear phishing score=$\alpha$(first value+third value)+$\beta$ (second value+third value), wherein:

$\alpha$ is a first weight value, and
   $\beta$ is a second weight value;
   compare the one or more spear phishing scores to one or more spear phishing thresholds;
   based on the comparison of the one or more spear phishing scores to the one or more spear phishing thresholds, generate one or more customized spear phishing training modules for the user of the first enterprise user device; and
   send, to the first enterprise user device, the one or more customized spear phishing training modules, wherein sending the one or more customized spear phishing training modules to the first enterprise user device causes the first enterprise user device to display the one or more customized spear phishing training modules.

2. The computing platform of claim 1, wherein the one or more first follow on simulated spear phishing electronic messages are further generated based on temporal information detected from the first enterprise user device.

3. The computing platform of claim 1, wherein the initial user interaction information indicates whether the user of the first enterprise user device performed one or more of: replied to the initial simulated spear phishing electronic message, forwarded the initial simulated spear phishing electronic message, or deleted the initial simulated spear phishing electronic message.

4. The computing platform of claim 3, wherein the first additional user interaction information indicates whether the user of the first enterprise user device performed one or more of: replied to the one or more first follow on simulated spear phishing electronic messages, forwarded the one or more first follow on simulated spear phishing electronic messages, or deleted the one or more first follow on simulated spear phishing electronic messages.

5. The computing platform of claim 1, wherein the memory stores additional computer-readable instructions that, when executed by the at least one processor, cause the computing platform to:
   dynamically identify $\alpha$ and $\beta$ based on receipt of the initial user interaction information.

6. The computing platform of claim 1, wherein the memory stores additional computer-readable instructions that, when executed by the at least one processor, cause the computing platform to:

generate the series of branching message templates, wherein generating the series of branching message templates comprises one or more of:
   generating, based on template input information, the series of branching message templates, or
   automatically generating the series of branching message templates based on one or more of: historical interaction information for the user of the first enterprise user device, spear phishing training modules previously completed by the user of the first enterprise user device, or a job role of the user of the first enterprise user device.

7. The computing platform of claim 6, wherein the series of branching message templates are specific to an industry associated with the user of the first enterprise user device.

8. The computing platform of claim 1, wherein the memory stores additional computer-readable instructions that, when executed by the at least one processor, cause the computing platform to:
   dynamically update the series of branching message templates based on interactions of other users with other spear phishing training modules.

9. The computing platform of claim 1, wherein the memory stores additional computer-readable instructions that, when executed by the at least one processor, cause the computing platform to:
   send, to a second enterprise user device, the initial simulated spear phishing electronic message;
   monitor the second enterprise user device to detect temporal information for the second enterprise user device;
   generate, based on the temporal information and using the series of branching message templates, one or more second follow on simulated spear phishing electronic messages; and
   send, to the second enterprise user device, the one or more second follow on simulated spear phishing electronic messages.

10. The computing platform of claim 9, wherein the memory stores additional computer-readable instructions that, when executed by the at least one processor, cause the computing platform to:
   receive, from the second enterprise user device, second additional user interaction information; and
   compute, based on the temporal information and the second additional user interaction information, one or more spear phishing scores corresponding to a user of the second enterprise user device.

11. The computing platform of claim 10, wherein comparing the one or more spear phishing scores to the one or more spear phishing thresholds comprises comparing the one or more spear phishing scores corresponding to the user of the first enterprise user device and the one or more spear phishing scores corresponding to the user of the second enterprise user device to the one or more spear phishing thresholds.

12. The computing platform of claim 11, wherein the one or more spear phishing scores corresponding to the user of the first enterprise user device include one or more of: a user specific score, a group specific score, or an organization specific score.

13. A method, comprising:
   at a computing platform comprising at least one processor, a communication interface, and memory:
      sending, by the at least one processor and to a first enterprise user device, an initial simulated spear phishing electronic message;
      receiving, at the at least one processor and from the first enterprise user device, initial user interaction information indicating a manner in which a user of the first enterprise user device interacted with the initial simulated spear phishing electronic message;
      execute a machine learning model employing a series of branching message templates, wherein executing the machine learning model includes using, as inputs, the initial user interaction information indicating the manner in which the user of the first enterprise user device interacted with the initial simulated spear phishing electronic message to output one or more first follow on simulated spear phishing electronic messages, wherein the one or more first follow on simulated spear phishing electronic messages are customized to target a weakness of the user based on the initial user interaction information indicating the manner in which the user of the first enterprise user device interacted with the initial simulated spear phishing electronic message;
      sending, by the at least one processor and to the first enterprise user device, the one or more first follow on simulated spear phishing electronic messages;
      receiving, at the at least one processor and from the first enterprise user device, first additional user interaction information indicating a manner in which the user of the first enterprise user device interacted with the one or more first follow on simulated spear phishing electronic messages;
      computing, by the at least one processor, based on the initial user interaction information indicating the manner in which the user of the first enterprise user device interacted with the initial simulated spear phishing electronic message, and the first additional user interaction information indicating the manner in which the user of the first enterprise user device interacted with the one or more first follow on simulated spear phishing electronic messages, one or more spear phishing scores corresponding to the user of the first enterprise user device, wherein computing the one or more spear phishing scores corresponding to the user of the first enterprise user device comprises:
         assigning a first value based on a type of response to the initial simulated spear phishing electronic message;
         assigning a second value based on a time difference between sending the initial simulated spear phishing electronic message and receiving the initial user interaction information;
         assigning a third value based on a type of response to the one or more first follow on simulated spear phishing electronic messages;
         assigning a fourth value based on a time difference between sending the one or more first follow on simulated spear phishing electronic messages and receiving the first additional user interaction information; and
         applying, using the first value, the second value, the third value, and the fourth value, a spear phishing scoring algorithm, wherein:
            the spear phishing scoring algorithm comprises:

spear phishing score=$\alpha$(first value+third value)+$\beta$ (second value+third value), wherein:
   $\alpha$ is a first weight value, and
   $\beta$ is a second weight value;

comparing, by the at least one processor, the one or more spear phishing scores to one or more spear phishing thresholds;

based on the comparison of the one or more spear phishing scores to the one or more spear phishing thresholds, generating, by the at least one processor, one or more customized spear phishing training modules for the user of the first enterprise user device; and sending, by the at least one processor and to the first enterprise user device, the one or more customized spear phishing training modules, wherein sending the one or more customized spear phishing training modules to the first enterprise user device causes the first enterprise user device to display the one or more customized spear phishing training modules.

14. The method of claim 13, wherein the one or more first follow on simulated spear phishing electronic messages are further generated based on temporal information detected from the first enterprise user device.

15. The method of claim 13, wherein the initial user interaction information indicates whether the user of the first enterprise user device performed one or more of: replied to the initial simulated spear phishing electronic message, forwarded the initial simulated spear phishing electronic message, or deleted the initial simulated spear phishing electronic message.

16. The method of claim 15, wherein the first additional user interaction information indicates whether the user of the first enterprise user device performed one or more of: replied to the one or more first follow on simulated spear phishing electronic messages, forwarded the one or more first follow on simulated spear phishing electronic messages, or deleted the one or more first follow on simulated spear phishing electronic messages.

17. The method of claim 13, further comprising:
dynamically identifying, by the at least one processor, α and β based on receipt of the initial user interaction information.

18. One or more non-transitory computer-readable media storing instructions that, when executed by a computing platform comprising at least one processor, a communication interface, and memory, cause the computing platform to:

send, to a first enterprise user device, an initial simulated spear phishing electronic message;

receive, from the first enterprise user device, initial user interaction information indicating a manner in which a user of the first enterprise user device interacted with the initial simulated spear phishing electronic message;

execute a machine learning model employing a series of branching message templates, wherein executing the machine learning model includes using, as inputs, the initial user interaction information indicating the manner in which the user of the first enterprise user device interacted with the initial simulated spear phishing electronic message to output one or more first follow on simulated spear phishing electronic messages, wherein the one or more first follow on simulated spear phishing electronic messages are customized to target a weakness of the user based on the initial user interaction information indicating the manner in which the user of the first enterprise user device interacted with the initial simulated spear phishing electronic message;

send, to the first enterprise user device, the one or more first follow on simulated spear phishing electronic messages;

receive, from the first enterprise user device, first additional user interaction information indicating a manner in which the user of the first enterprise user device interacted with the one or more first follow on simulated spear phishing electronic messages;

compute, based on the initial user interaction information indicating the manner in which the user of the first enterprise user device interacted with the initial simulated spear phishing electronic message and the first additional user interaction information indicating the manner in which the user of the first enterprise user device interacted with the one or more first follow on simulated spear phishing electronic messages, one or more spear phishing scores corresponding to the user of the first enterprise user device, wherein computing the one or more spear phishing scores corresponding to the user of the first enterprise user device comprises:

assigning a first value based on a type of response to the initial simulated spear phishing electronic message;

assigning a second value based on a time difference between sending the initial simulated spear phishing electronic message and receiving the initial user interaction information;

assigning a third value based on a type of response to the one or more first follow on simulated spear phishing electronic messages;

assigning a fourth value based on a time difference between sending the one or more first follow on simulated spear phishing electronic messages and receiving the first additional user interaction information; and applying, using the first value, the second value, the third value, and the fourth value, a spear phishing scoring algorithm, wherein:

the spear phishing scoring algorithm comprises:

spear phishing score=α(first value+third value)+β (second value+third value), wherein:

α is a first weight value, and

β is a second weight value;

compare the one or more spear phishing scores to one or more spear phishing thresholds;

based on the comparison of the one or more spear phishing scores to the one or more spear phishing thresholds, generate one or more customized spear phishing training modules for the user of the first enterprise user device; and send, to the first enterprise user device, the one or more customized spear phishing training modules, wherein sending the one or more customized spear phishing training modules to the first enterprise user device causes the first enterprise user device to display the one or more customized spear phishing training modules.

19. The one or more non-transitory computer-readable media of claim 18, wherein the one or more first follow on simulated spear phishing electronic messages are further generated based on temporal information detected from the first enterprise user device.

20. The one or more non-transitory computer-readable media of claim 18, wherein the initial user interaction information indicates whether the user of the first enterprise user device performed one or more of: replied to the initial simulated spear phishing electronic message, forwarded the initial simulated spear phishing electronic message, or deleted the initial simulated spear phishing electronic message.

* * * * *